April 22, 1930.  J. W. TATTER  1,755,525
BRAKE
Filed July 5, 1927   3 Sheets-Sheet 1

Witness:
William P. Kilroy

Inventor:
John W. Tatter

April 22, 1930.  J. W. TATTER  1,755,525
BRAKE
Filed July 5, 1927    3 Sheets-Sheet 2

Witness:
William P. Kilroy

Inventor:
John W. Tatter

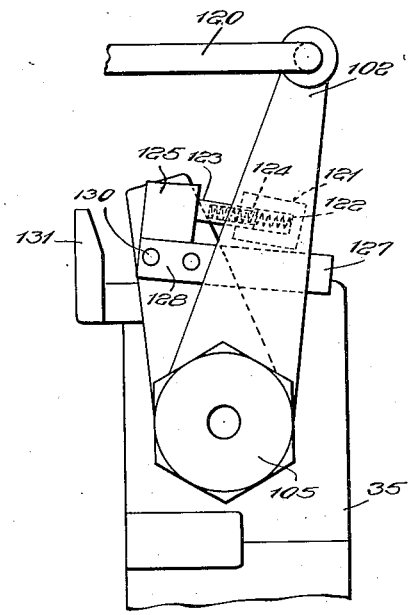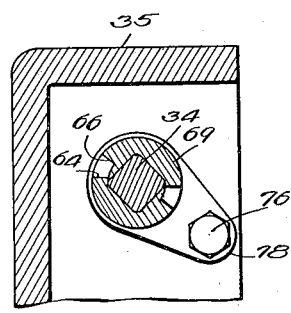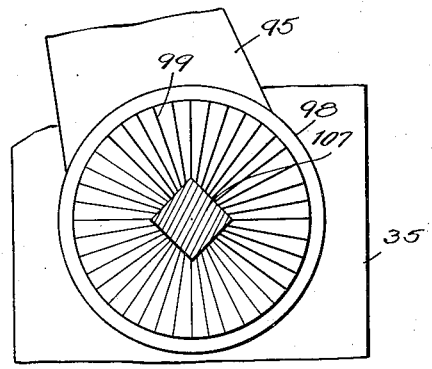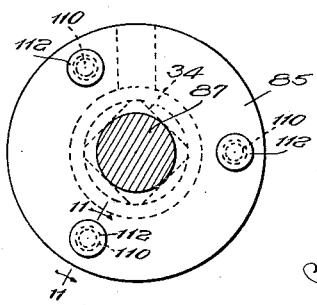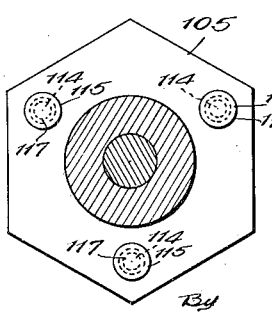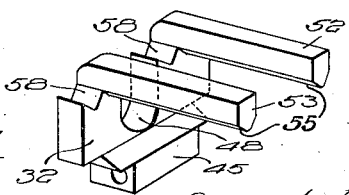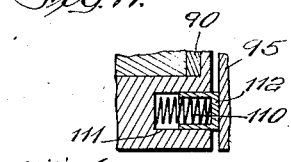

Patented Apr. 22, 1930

1,755,525

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

BRAKE

Application filed July 5, 1927. Serial No. 203,588.

My invention relates broadly to brakes and particularly to brakes adapted to be embodied in self-propelled vehicles such as automobiles and tractors.

A particular object of the invention is to provide a brake which will automatically adjust itself to compensate for wear therein.

Another particular object of the invention is to provide improved means for automatically taking up slack in a brake band so that the brake band will effectively engage the associated brake drum, or the equivalent, when the brake mechanism is actuated.

Still another particular object of the invention is to provide improved means for frictionally engaging the brake drum, or the equivalent, of a brake so that the braking effort will be applied quickly and effectively.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Figure 1:
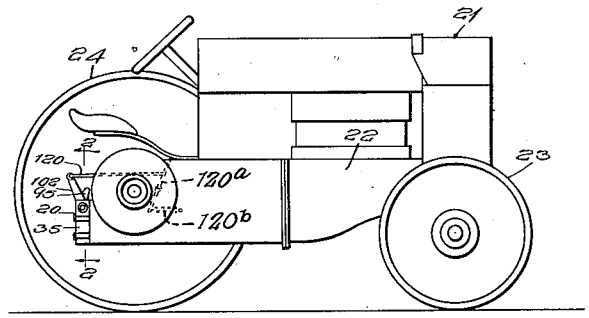
Fig. 1 is a side elevation of a tractor which has a brake embodying my invention applied to it.
Figure 4:
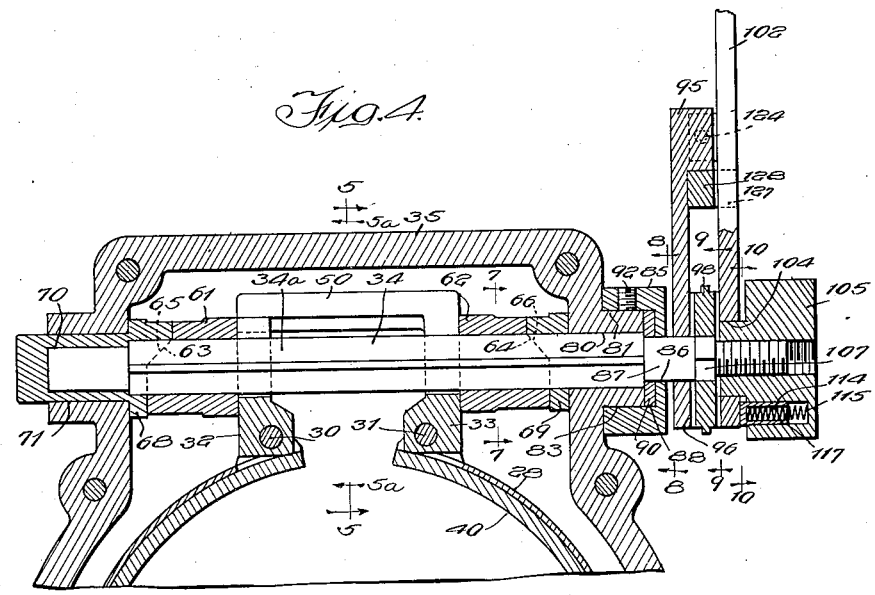
Fig. 4 is a section taken on line 4—4 of Fig. 3.
Figure 3:
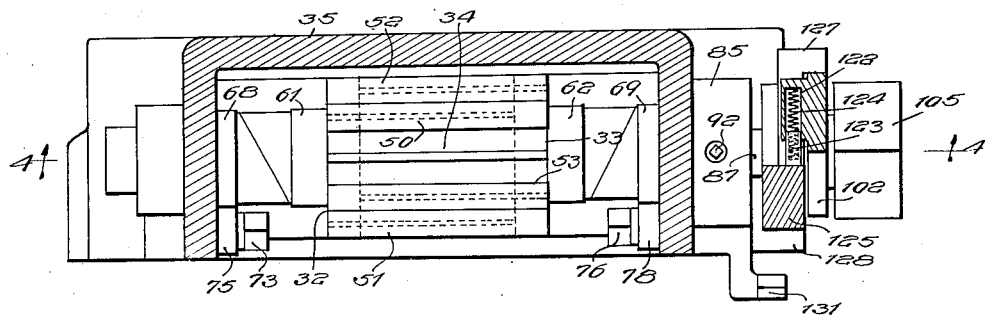
Fig. 3 is a section taken on line 3—3 of Fig 2.
Figure 5:
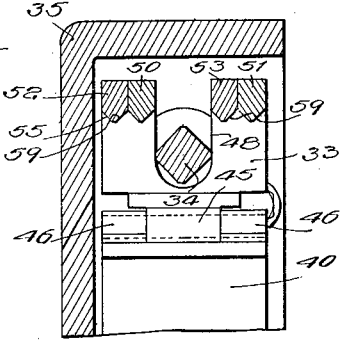
Fig. 5 is a section taken on line 5—5 of Fig. 4.
Figure 5A:
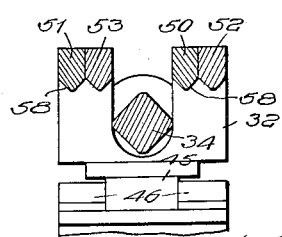

Fig. 5ª is a section taken on line 5ª—5ª of Fig. 4;

Fig. 6 is an enlarged fragmentary side elevation of the improved brake shown in Fig. 1;

Fig. 7 is a section taken on line 7—7 of Fig. 4;

Fig. 8 is a section taken on line 8—8 of Fig. 4;

Fig. 9 is a section taken on line 9—9 of Fig. 4;

Fig. 10 is a section taken on line 10—10 of Fig. 4;

Fig. 11 is a section taken on line 11—11 of Fig. 8; and

Fig. 12 is a perspective view of one of the parts of my improved brake.

Referring to the drawings, I have shown one form of the invention embodied in a brake which is particularly adapted to be employed in connection with self-propelled vehicles such as automobiles, tractors, or the like. However, it is to be understood that I am limited to this use only to the extent indicated in the appended claims. The improved brake is designated generally by the reference character 20 and is shown in connection with a tractor which is designated generally by the reference character 21, the tractor 21 being of a well known type and preferably comprising a chassis 22 and front and rear wheels 23 and 24, respectively. An internal combustion engine (not shown) mounted on the chassis 22 is operatively connected to a propeller shaft 25 which is geared to the rear wheels 24. In this embodiment of the invention, the propeller shaft 25 projects from the rear end of the chassis 22 and a brake drum 27 is rigidly secured thereto. Disposed around the brake drum 27 is a brake band 28 which is preferably similar in construction to the improved brake band shown and described in my copending application, Serial No. 145970, filed November 3, 1926. Thus, the brake band 28 is preferably thickest at a point substantially midway between its ends and tapers from this point toward each of its ends, the ends of the brake band being pivoted by pins 30 and 31 to members 32 and 33, respectively, which are mounted upon a shaft 34 carried in a housing 35 which encloses the brake drum 27 and the brake band 28. As shown, the housing 35 is preferably secured by bolts 37, or the equivalent, to the body portion 22 of the tractor.

The brake band 28 is preferably formed from metal and is preferably provided with a friction lining 40 engageable with the brake drum 27, the construction being such that when the ends of the brake band 28 are drawn toward each other, the brake band bends in such manner that all parts of the friction lining 40 effectively engage the brake drum and no part of the brake lining is subjected to more wear than any other part thereof. This construction is more fully explained in my aforementioned copending application. To prevent lateral displacement of the brake band 28 relative to the brake drum 27, I preferably provide a pin 42 which projects from the brake band and engages a slot 43 formed in the housing 35, the slot being of such proportions that the pin and brake band are held against lateral displacement relative to the brake drum but may move circumferentially thereof. Where no specific reference is made to the friction lining in the appended claims, it is to be understood that such construction is optional.

Figure 2:
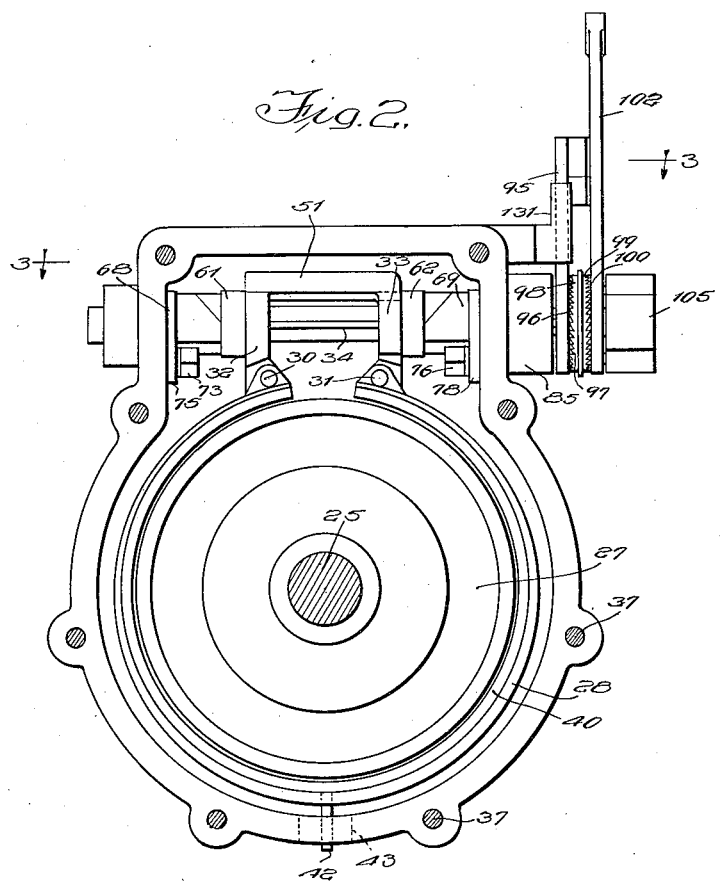
Fig. 2 is a section taken on line 2—2 of Fig. 1.

The members 32 and 33 are substantially identical in construction. As best shown in Figs. 2 and 5, lugs 45 formed integral with the members 32 and 33 fit snugly between brackets 46 rigidly secured to the ends of the brake band 28, the aforementioned pins 30 and 31 being inserted through suitable apertures formed in the lugs 45 and the brackets 46. Each of the members 32 and 33 is also provided with a slot 48 which accommodates the aforementioned shaft 34. Obviously, if the members 32 and 33 are displaced toward each other, the brake band 28 will bring the brake lining 40 into effective engagement with the brake drum 27. It will be readily understood, however, that if the members 32 and 33 were angularly displaced toward each other around the longitudinal axes of the pins 30 and 31, the ends of the brake band 28 would be moved inwardly toward the brake drum 27 before the center thereof would bring the central portion of the friction lining 40 into engagement with the drum. This would cause excessive wear upon those portions of the brake lining carried by the ends of the brake band and would cause the brake band to chatter. To prevent such angular displacement of the members 32 and 33 around the longitudinal axes of the pins 30 and 31, respectively, I preferably provide lugs or fingers 50 and 51 upon the member 33 and fingers 52 and 53 upon the member 32. As set forth above, the members 32 and 33 are substantially identical in construction and, therefore, it will be readily understood that the fingers 50, 51, 52 and 53 are also substantially identical in construction. Each of the members 50, 51, 52 and 53 is preferably provided with a V-shaped surface 55 engageable with a V-shaped groove provided in that member 32 or 33 with which it is not formed integral. Thus, the V-shaped surfaces 55 of the fingers 50 and 51 ride in V-shaped grooves 58 provided in the member 32 and the V-shaped surfaces 55 of the fingers 52 and 53 ride in V-shaped grooves 59 provided in the member 33. Obviously, the fingers 50, 51, 52 and 53 prevent angular displacement of the members 32 and 33 toward each other around the longitudinal axes of the pins 30 and 31, respectively, and also prevent the ends of the brake band 28 from being twisted so as to bring corners of the friction lining 40 out of engagement with the brake drum 27 when the members 32 and 33 are displaced toward each other.

It will be noted that the intermediate portion of the shaft 34 is substantially rectangular in cross section and that irrotatably mounted thereon are sleeves 61 and 62 engageable with the members 32 and 33, respectively. This substantially rectangular portion of the shaft is designated by the reference character 34ª. Formed upon the sleeves 61 and 62 are cam surfaces 63 and 64, engageable with cam surfaces 65 and 66, respectively, which are formed upon a bearing member 68 and a collar 69, respectively. The bearing member 68 journals a cylindrical end 70 of the shaft 34 and is itself mounted in a bore 71 formed in the housing 35, the bearing member 68 being held against rotation by a bolt 73, or the equivalent, which is screw-threaded into the housing member 35 and passes through a lug 75 formed integral with the bearing member 68. The collar 69 is held agianst rotation around the longitudinal axis of the shaft 34 by a bolt 76, or the equivalent, which is screw-threaded into the housing member 35 and passes through a lug 78 formed integral with the collar.

The cam surfaces 63, 64, 65 and 66 are designed so that if the shaft 34 is angularly displaced around its longitudinal axis to angularly displace the sleeves 61 and 62 around the same axis, the cam surfaces 63 and 64 will ride up on the cam surfaces 65 and 66, respectively, and cause the sleeves 61 and 62 to displace the members 32 and 33 toward each other. Of course, such displacement of the members 32 and 33 causes the brake band 28 to bring the brake lining 40 into effective engagement with the brake drum 27.

The right hand end of the rectangular portion 34ª of the shaft 34 (Fig. 4) is journaled in a bore 80 provided in a boss 81 which is preferably formed integral with the housing 35. The boss 81 projects into a relatively large bore 83 formed in a collar 85 which is also provided with a smaller bore 86 journaling a cylindrical portion 87 of the shaft 34. Interposed between the shoulder 88 formed in the collar 85 and one end of the rectangular portion 34ª of the shaft 34 is a washer 90 which is preferably formed of felt, or the equivalent. The felt washer serves as packing in the present instance to prevent loss of lubricant from the housing 35. The collar 85 is preferably secured by a set screw 92, or the equivalent, to the boss 81.

Pivotally mounted upon the cylindrical portion 87 of the shaft 34 is a lever 95 which is provided with ratchet teeth 96 engageable with ratchet teeth 97 formed on a collar 98, the collar 98 being also provided with ratchet teeth 99 which are engageable with ratchet teeth 100 formed upon a lever 102 which is journaled upon a cylindrical extension 104 formed upon a collar 105. The collar 105 is screw-threaded upon one end of the shaft 34 and the collar 98 is irrotatably mounted upon a substantially rectangular portion 107 of the shaft 34.

As best illustrated in Figs. 8 and 11, the lever 96 is urged toward the collar 98 by a plurality of springs 110 which are positioned in recesses 111 formed in the collar 85. It will be noted that each of the springs 110 urges a cup-shaped member 112 against the lever 95, the cup-shaped members 112 being slidably journaled in the recesses 111. The lever 102 is urged toward the collar 98 by a plurality of springs 114 disposed in recesses 115 formed in the collar 105, the springs 114 being adapted to urge cup-shaped members 117 against the lever 102. It will be noted that the cup-shaped members 117 are slidably journaled in the recesses 115.

The free end of the lever 102 is connected by a link 120, or the equivalent to a foot pedal 120$^a$, or the equivalent, whereby the brake mechanism is actuated, a spring 120$^b$ being provided to retract the pedal 120$^a$ and the mechanism connected therewith. Formed integral with the lever 102 is a boss 121 having a recess 122 in which a plunger 123 is slidably journaled, a compression spring 124 being positioned between the plunger and the bottom of the recess. The spring 124 urges the plunger 123 against a boss 125 which is preferably formed integral with the lever 95. Obviously, the spring 124 tends to displace the levers 95 and 102 relative to each other so that the angular distance therebetween will be increased. To limit such angular displacement of the levers 95 and 102 relative to each other, I preferably provide a stop 127 on one end of a bar 128 which is preferably secured by rivets 130, or the equivalent, to the lever 95. Angular displacement of the lever 95 in a counter-clockwise direction (Fig. 6) around the longitudinal axis of the shaft 34 is preferably limited by a stop 131, or the equivalent, formed integral with the housing member 35.

The operation of the above described braking mechanism is substantially as follows: It is readily understood that when the foot pedal 120$^a$ is depressed to angularly displace the lever 102 in a counter-clockwise direction (Fig. 6), the lever 95 will move in unison with the lever 102 until it engages the stop 131 whereupon the spring 124 will yield so that the lever 102 can continue to rotate in a counter-clockwise direction (Fig. 6). The brake mechanism is constructed so that the angular displacement of the lever 102 in a counter-clockwise direction (Fig. 6) will cause the shaft 34 to be displaced in a like direction so that the cam surfaces 63 and 64 upon the sleeves 61 and 62, respectively, will ride up upon the cam surfaces 65 and 66, respectively, and cause the members 32 and 33 to be displaced toward each other so that the brake band will bring the friction lining 40 into effective engagement with the brake drum 27. When the apparatus functions in this manner and there is not an undesirable amount of slack in the brake band 28, the angular movement of the lever 102 is transmitted to the shaft 34 through the ratchet teeth 99 and 100 and the spring 124 is compressed to a less degree than is necessary to have the teeth 97 upon the collar 98 slip over a distance of one tooth upon the ratchet tooth 96 of the lever 95. Of course, when the lever 102 approaches the lever 95 and the spring 124 is compressed, the teeth 97 ride up upon the teeth 96 and the lever 95 is moved away from the collar 98 against the action of the springs 110.

If there is too much slack in the brake band 28, the lever 102 will have to be displaced through a relatively large angle before the brake band will bring the brake lining into effective engagement with the brake drum 27. In this event, the angular displacement of the lever 102 after the lever 95 has engaged the stop 131 will cause the ratchet teeth 97 to advance through an angle greater than the angular distance between adjacent teeth of the ratchet teeth 96 and when the lever 102 returns to the position wherein it is shown in full lines in Fig. 6, the spring 124 will elongate until the stop 127 engages the lever 102. This movement of the lever 95 relative to the lever 102 to bring the stop 127 into engagement with the lever 102 is accompanied by displacement of the teeth 99 a distance equal to one tooth upon the teeth 100 so that the shaft 34 is angularly displaced through an equal angle. This will cause the cam surfaces 63 and 64 to ride up upon the cam surfaces 65 and 66, respectively, and the slack in the brake band 28 will be taken up so that the next time the lever 102 is angularly displaced in a counter-clockwise direction (Fig. 6), the brake lining 40 will effectively engage the brake drum 27 before the lever 102 can be displaced through an angle which is sufficiently large to cause the teeth 97 to advance upon the teeth 96. However, if the brake lining is subsequently subjected to sufficient wear, the teeth 97 will advance upon the teeth 96 to cause the teeth 99 to again advance upon the teeth 100 so that slack in the brake band 28 will be taken up. Of course, displacement of the ratchet teeth 97 and 99 upon the ratchet teeth 96 and 100, respectively, is not necessarily limited to a distance which will only cause the teeth 97 and 99 to advance through an angle equal to the angle between any two adjacent teeth 96 or any two adjacent teeth 100.

Having thus described my invention, it is obvious that various immaterial modifications may be made in the same, without departing from the spirit of my invention; hence I do not wish to be understood as limiting myself to the exact form, construction, arrangement and combination of parts herein shown and described, or uses mentioned.

What I claim as new and desire to secure by Letters Patent is:

1. Brake mechanism comprising a brake element, a second brake element, a rotatable shaft, means operated by the shaft for bringing said second brake element into and out of effective frictional engagement with the first-mentioned brake element, means rigidly secured to said shaft, a member rotatably mounted on said shaft and engageable with the last-mentioned means to rotate therewith and to be rotated thereby, a spring for holding said member in engagement with said last-mentioned means, a second member rotatably mounted on said shaft and engageable with said last-mentioned means to rotate therewith and to be rotated thereby, a second spring for holding said second member in engagement with said last-mentioned means, spring means for angularly displacing said members relative to each other, a stop carried by one of said members and engageable with the other, a second stop engageable with the first-mentioned member, and mechanism for causing said second member to rotate said last-mentioned means.

2. Brake mechanism comprising a brake element, a second brake element, a rotatable shaft, means operated by the shaft for bringing said second brake element into and out of effective frictional engagement with the first-mentioned brake element, means rigidly secured to said shaft and provided with ratchet teeth, a member rotatably mounted on said shaft and having ratchet teeth engageable with the ratchet teeth provided upon said last-mentioned means, a spring for holding the ratchet teeth provided on said member in engagement with the ratchet teeth provided upon said last-mentioned means, a second member rotatably mounted on said shaft and provided with ratchet teeth engageable with ratchet teeth provided upon said last-mentioned means, a spring for holding the ratchet teeth provided upon said second member in engagement with ratchet teeth provided upon said last-mentioned means, a spring for angularly displacing said members relative to each other, a stop carried by one of said members and engageable with the other, a second stop engageable with the first-mentioned member, and mechanism for causing said second member to rotate said last-mentioned means through the medium of the ratchet teeth provided upon said second member and said last-mentioned means.

3. Brake mechanism comprising a brake element, a second brake element, a rotatable shaft, means for bringing said second brake element into and out of effective frictional engagement with the first-mentioned brake element, means rigidly secured to said shaft, a member rotatably mounted on said shaft and engageable with the last-mentioned means to rotate therewith and to be rotated thereby, a spring for holding said member in engagement with said last-mentioned means, a second member rotatably mounted on said shaft and engageable with said last-mentioned means to rotate therewith and to be rotated thereby, a second spring for holding said second member in engagement with said last-mentioned means, spring means for angularly displacing said members relative to each other, a stop carried by one of said members and engageable with the other, a second stop engageable with the first-mentioned member, and mechanism for causing said second member to rotate said last-mentioned means.

In testimony whereof, I have hereunto signed my name.

JOHN W. TATTER.